(12) United States Patent  (10) Patent No.: US 7,548,205 B2
Mohamadi  (45) Date of Patent: Jun. 16, 2009

(54) WAFER SCALE ANTENNA MODULE WITH A BACKSIDE CONNECTIVITY

(76) Inventor: Farrokh Mohamadi, 8 Halley, Irvine, CA (US) 92612-3797

( * ) Notice: Subject to any disclaimer, the term of this patent is extended or adjusted under 35 U.S.C. 154(b) by 359 days.

(21) Appl. No.: 11/384,589

(22) Filed: Mar. 20, 2006

(65) Prior Publication Data

US 2006/0176211 A1  Aug. 10, 2006

Related U.S. Application Data

(63) Continuation-in-part of application No. 10/891,352, filed on Jul. 14, 2004, now Pat. No. 7,042,388.

(60) Provisional application No. 60/487,418, filed on Jul. 15, 2003.

(51) Int. Cl.
*H01Q 1/38* (2006.01)
(52) U.S. Cl. .................. 343/700 MS; 343/792
(58) Field of Classification Search ........... 343/700 MS
See application file for complete search history.

(56) References Cited

U.S. PATENT DOCUMENTS 5,400,039 A * 3/1995 Araki et al. ........... 343/700 MS
6,864,585 B2 * 3/2005 Enquist ..................... 257/777
6,885,344 B2 * 4/2005 Mohamadi ........... 343/700 MS
7,126,212 B2 * 10/2006 Enquist et al. ............. 257/684
7,312,763 B2 * 12/2007 Mohamadi .................. 343/853
7,423,607 B2 * 9/2008 Mohamadi .................. 343/853
2003/0119279 A1 * 6/2003 Enquist ..................... 438/455

* cited by examiner

*Primary Examiner*—Trinh V Dinh
(74) *Attorney, Agent, or Firm*—Haynes & Boone, LLP.

(57) ABSTRACT

In one embodiment, wafer-scale antenna module is provided that includes: a substrate having a first surface and an opposing second surface; a plurality of conductive contact regions extending from the first surface into the substrate towards the second surface; active circuitry formed in the substrate adjacent the second surface, the active circuitry electrically coupled to the conductive contact regions; an insulating layer adjacent the first surface, the insulating layer forming a plurality of vias arranged corresponding to the plurality of conductive contact regions, each via forming an opening at the corresponding conductive contact region; and a plurality of antennas formed on the insulating layer corresponding to the plurality of vias; wherein each via contains an electrical conductor to electrically couple the corresponding contact region to the antenna corresponding to the via, whereby a resulting separation between the driving circuitry and the antennas aids an electrical isolation of the driving circuitry from the antennas.

14 Claims, 14 Drawing Sheets

US 7,548,205 B2

WAFER SCALE ANTENNA MODULE WITH A BACKSIDE CONNECTIVITY

RELATED APPLICATIONS

This application is a continuation-in-part of U.S. application Ser. No. 10/891,352, filed Jul. 14, 2004, now U.S. Pat. No. 7,042,388, which in turn claims the benefit of U.S. Provisional Application No. 60/487,418, filed Jul. 15, 2003, the contents of both of which are incorporated by reference.

TECHNICAL FIELD

The present invention relates generally to beam forming antenna systems, and more particularly to a beam forming wafer scale antenna module with backside connectivity.

BACKGROUND

Conventional beam forming systems are often cumbersome to manufacture. In particular, conventional beam forming antenna arrays require complicated feed structures and phase-shifters that are impractical to be implemented in a semiconductor-based design due to its cost, power consumption and deficiency in electrical characteristics such as insertion loss and quantization noise levels. In addition, such beam forming arrays make digital signal processing techniques cumbersome as the operating frequency is increased. In addition, at the higher data rates enabled by high frequency operation, multipath fading and cross-interference becomes a serious issue. Adaptive beam forming techniques are known to combat these problems. But adaptive beam forming for transmission at 10 GHz or higher frequencies requires massively parallel utilization of A/D and D/A converters.

To avoid the problems in the prior art, U.S. Pat. No. 6,885,344 discloses a beam forming antenna system that is compatible with semiconductor processing techniques. For example, FIG. 1 illustrates a beam forming antenna system 100. For illustration clarity, only a single antenna 160 is illustrated. Any suitable topology may be used for the antennas, such as patches, dipoles, or monopoles. For example, antenna 160 may comprise a T-shaped dipole antenna formed using conventional semiconductor processing techniques. Antenna 160 is excited using vias 110 that extend through insulating layers 105 and through a ground plane 120 to driving transistors formed on an active layer 130 separated from a substrate 150 by insulating layer 105. Two elements 101 may be excited by switching layer 130 to form a T-shaped dipole pair 160. To provide polarization diversity, two dipole pairs 160 may be arranged such that the transverse arms in a given dipole pair are orthogonally arranged with respect to the transverse arms in the remaining dipole pair.

Depending upon the desired operating frequencies, each dipole pair 160 may have multiple transverse arms. The length of each transverse arm is approximately one-fourth of the wavelength for the desired operating frequency. For example, a 2.5 GHz signal has a quarter wavelength of approximately 30 mm, whereas a 10 GHz signal has a quarter wavelength of approximately 7.5 mm. Similarly, a 40 GHz signal has a free-space quarter wavelength of 2.1 mm. Thus, a T-shaped dipole 160 configured for operation at these frequencies would have three transverse arms having fractions of lengths of approximately 30 mm, 7.5 mm and 2.1 mm, respectively. The longitudinal arm of each T-shaped element may be varied in length from 0.01 to 0.99 of the operating frequency wavelength depending upon the desired performance of the resulting antenna. For example, for an operating frequency of 105 GHz, a longitudinal arm may be 500 micrometers in length and a transverse arm may be 900 micrometers in length using a standard semiconductor process. In addition, the length of each longitudinal arm within a dipole pair may be varied with respect to each other. The width of a longitudinal arm may be tapered across its length to lower the input impedance. For example, it may range from 10 micrometers in width at the via end to hundreds of micrometers at the opposite end. The resulting input impedance reduction may range from 800 ohms to less than 50 ohms.

Advantageously, each antenna element 101 is formed using an available metal layer provided by the semiconductor manufacturing process. Each metal layer forming an antenna element may be copper, aluminum, gold, or other suitable metal. To suppress surface waves and block the radiation vertically, insulating layer 105 between adjacent antenna elements within a dipole pair may have a relatively low dielectric constant such as $\epsilon=3.9$ for silicon dioxide. The dielectric constant of the insulating material beneath the antenna elements forming the remainder of the layers may be relatively high such as $\epsilon=7.1$ for silicon nitride, $\epsilon=11.5$ for $Ta_2O_5$, or $\epsilon=11.7$ for silicon. Similarly, the dielectric constant for the insulating layer 105 above ground plane 120 should also be very low (such as $\epsilon=3.9$ for silicon dioxide, $\epsilon=2.2$ for Teflon, or 1.0 for air should the insulating layer comprise a honeycombed structure).

The quarter wavelength discussion with respect to each antenna element may be generally applied to other antenna topologies such as patch antennas. However, note that it is only at relatively high frequencies such as the upper bands within the W band of frequencies that the quarter wavelength of a carrier signal in free space is comparable or less than the thickness of substrate 150. Accordingly, at lower frequencies, integrated antennas should be elevated away from the substrate by using an interim dielectric layer. An exemplary beam forming system 200 having such an interim dielectric layer is shown in FIG. 2. Several T-shaped dipole antennas 201 are shown in FIG. 2. A semiconductor substrate 250 includes RF driving circuitry 230 that drives each T-shaped dipole antenna 201 through vias 210 analogously as discussed with respect to beam forming system 100. However, a grounded shield 120 is separated from the T-shaped dipole antennas 201 by a relatively thick dielectric layer 240. For example, dielectric layer 240 may be 1 to 2 mm or more in thickness. In this fashion, lower frequency performance is enhanced. In addition, dielectric layers 240 and an inter-layer dielectric layer 270 may be constructed from flexible materials for a conformal application. Layers 240 and 270 may be separated by an additional ground plane 225.

Although the beam forming systems of FIGS. 1 and 2 advantageously may be integrated onto a semiconductor wafer, the driving transistors are formed on a substrate surface that faces the antennas. As the number of antennas within the array is increased, the coupling of signals to the antenna's driving circuitry becomes cumbersome, particularly for a wafer-scale design.

Accordingly, there is a need in the art for improved wafer scale beam forming antenna systems.

SUMMARY

In accordance with another aspect of the invention, a wafer-scale antenna module is provided that includes: a substrate having a first surface and an opposing second surface; a plurality of conductive contact regions extending from the first surface into the substrate towards the second surface;

active circuitry formed in the substrate adjacent the second surface, the active circuitry electrically coupled to the conductive contact regions; an insulating layer adjacent the first surface, the insulating layer forming a plurality of vias arranged corresponding to the plurality of conductive contact regions, each via forming an opening at the corresponding conductive contact region; and a plurality of antennas formed on the insulating layer corresponding to the plurality of vias; wherein each via contains an electrical conductor to electrically couple the corresponding contact region to the antenna corresponding to the via, whereby a resulting separation between the driving circuitry and the antennas aids an electrical isolation of the driving circuitry from the antennas.

In accordance with another aspect of the invention, a method is provided that includes: forming conductive contact regions in a substrate extending from a first surface of the substrate towards an opposing second surface of the substrate; forming active circuitry in the substrate adjacent the second surface, the active circuitry coupling to the conductive contact regions; and forming a plurality of antennas adjacent the first surface of the substrate.

The invention will be more fully understood upon consideration of the following detailed description, taken together with the accompanying drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 2:
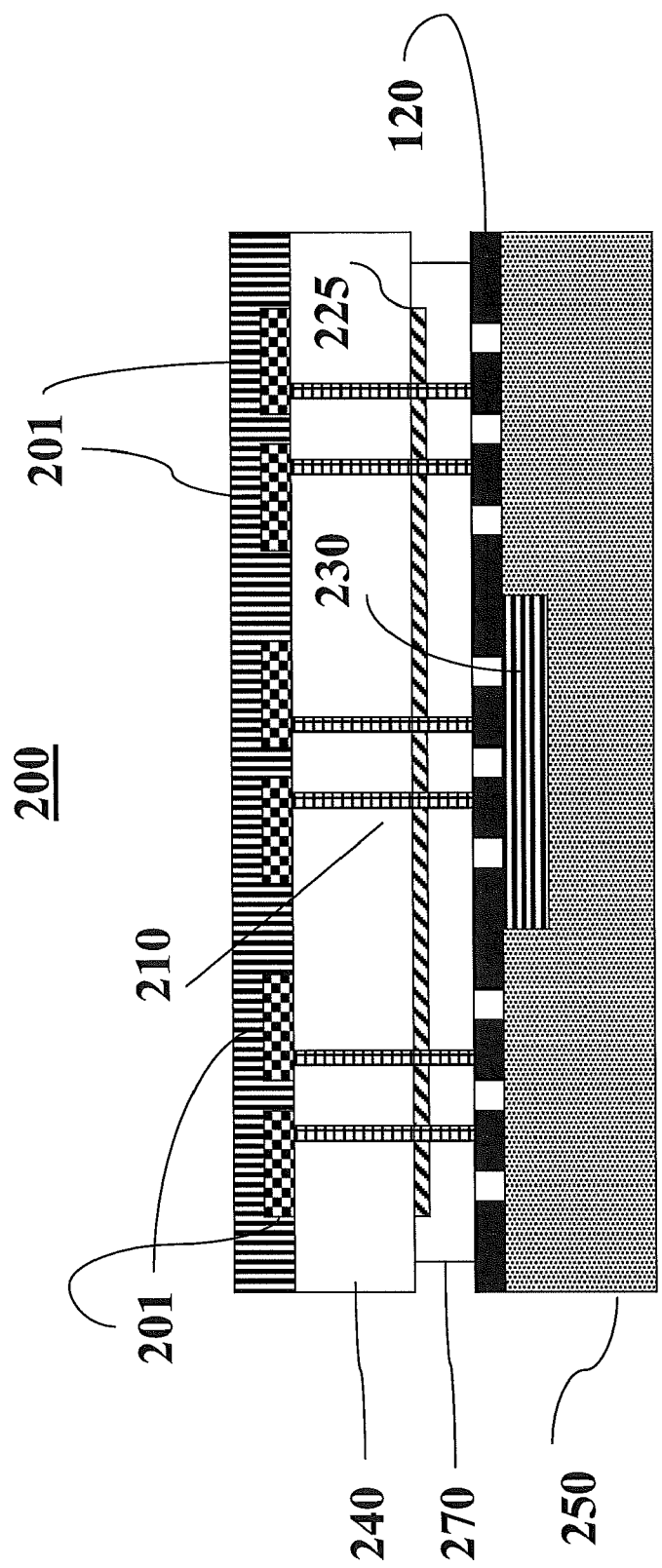
FIG. 2 is a cross-sectional view of a wafer-scale beam forming system having T-shaped dipole antennas separated from the semiconductor substrate by a passivation layer.
Figure 3:
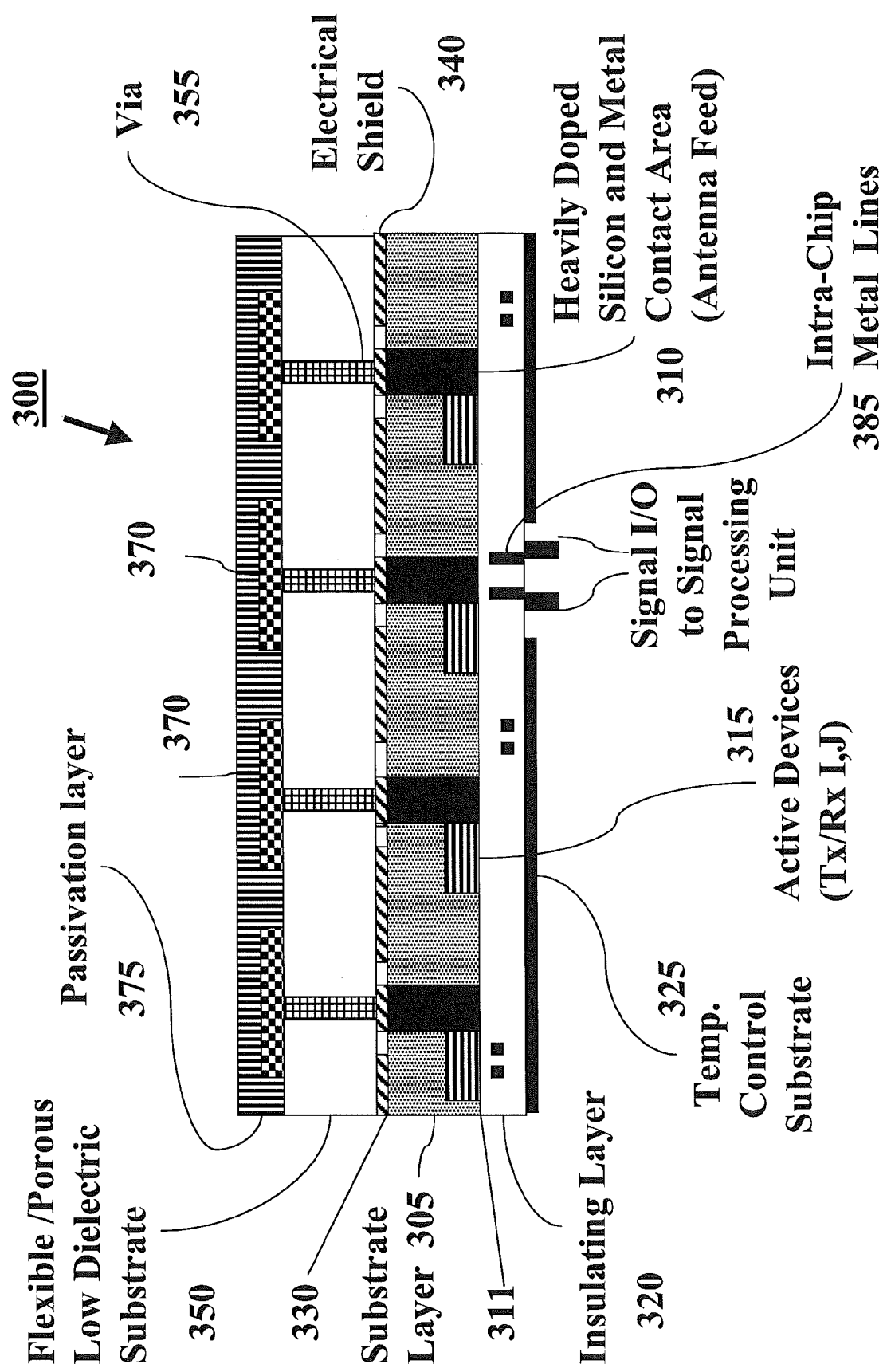
FIG. 3 is a cross-sectional view of a wafer-scale beam forming antenna module in which the active circuitry is formed on a backside of the substrate in accordance with an embodiment of the invention.

The present invention provides a wafer scale antenna module having improved connectivity properties. In this improved wafer scale antenna module, the antennas are adjacent a first side of the semiconductor wafer whereas the driving circuitry is formed on an opposing second side of the wafer. In this fashion, connectivity to the driving circuitry for control and power purposes is not hampered by the necessary coupling between the driving circuitry and the antennas. An exemplary embodiment for such a "backside" wafer-scale antenna module 300 is shown in FIG. 3. In this embodiment, the antennas elements comprise patch antenna elements 370. As discussed with regard to FIG. 2, wafer-scale antenna module 300 includes a relatively thick dielectric layer 350 such that patch antenna elements 370 are separated from a substrate 305 by the relatively thick dielectric layer. To allow the formation of active circuitry on one side of the substrate and the patch antennas on the opposing side of substrate, heavily doped (which may be either n+ or p+ depending upon design considerations) contact areas 310 are diffused through the substrate to serve as feed structures for the patch antennas. Active circuitry 315 to drive the antennas may then be formed on a back surface 311 of the substrate. The active circuitry may next be passivated through the deposition of a passivation layer 320 on surface 311. For example, layer 320 may comprise a low temperature porous SiOx layer and a thin layer of Nitride ($Si_xO_yN_z$) such that passivation layer 320 is a fraction to a few microns in thickness. Passivation layer 320 may then be coated with an electrically and thermally conductive material 325 and taped to a plastic adhesive holder so that the substrate may be flipped to expose an as yet-unprocessed side 330 of the substrate/wafer.

Figure 1:
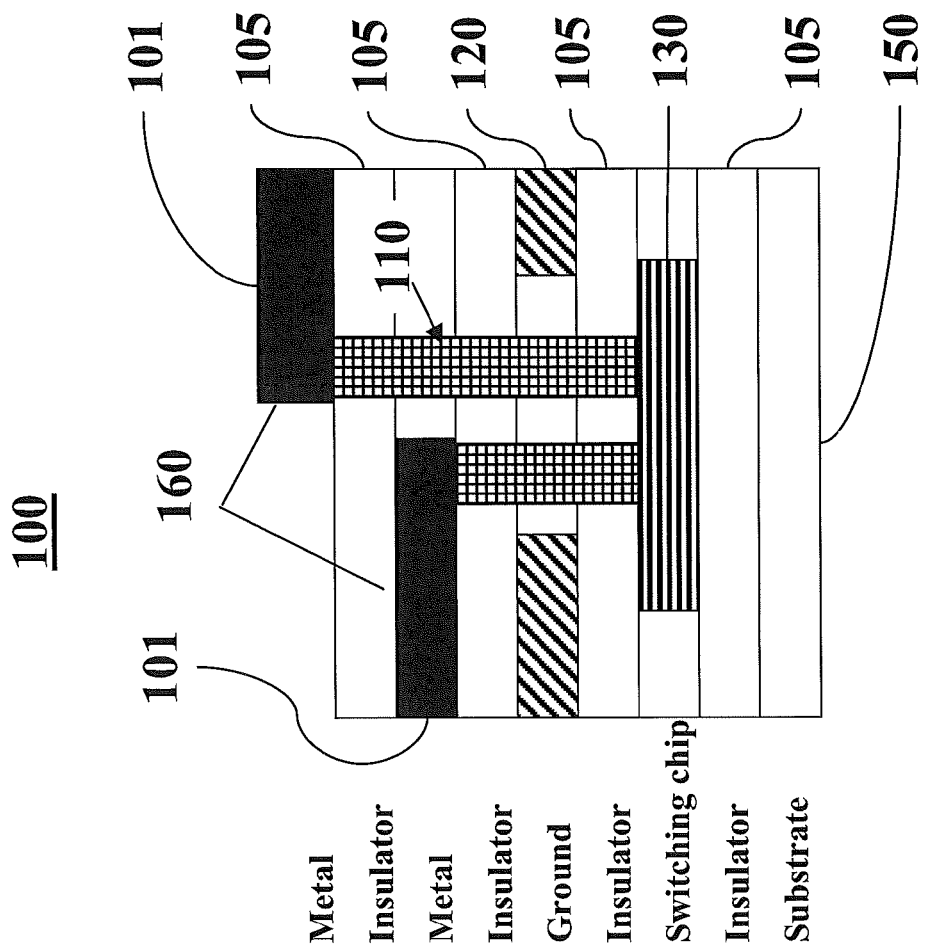
FIG. 1 is a cross-sectional view of a wafer-scale beam forming system having T-shaped dipole antennas formed using semiconductor process metal layers.

To ensure that contact areas 310 electrically couple through the substrate, side 330 may be back-grinded such that the substrate has a thickness of a few tens or fractions of tens of micrometers. An optional metallization layer 340 may then be sputtered or alternatively coated using conductive paints onto surface 330. Layer 340 acts as an electromagnetic shield as well as a reflective plane between the antennas and the active circuitry. To assist electrical coupling to the antennas, metal layer 340 may be patterned to form metal lumps on top of contacts 310. The relatively thick dielectric layer 350 of porous low dielectric material or honeycomb structure may then be deposited or placed onto metal layer 340. Layer 350 may also be formed of flexible material for conformal designs. Target alignment patterns that were etched during conventional manufacturing of the substrate may then be used to guide the location of vias 355, which may be bored using micro-machining techniques through layer 350. Alternatively, a conventional infra-red alignment scheme may be used to locate vias 355. Precision rods 360 are then inserted through vias 355 to allow electrical coupling between the active circuitry and the antennas. Alternatively, a conductive material may be deposited into vias 355. Advantageously, the formation of metal bumps as described previously in metal layer 340 eases the formation of ohmic contacts between contacts 310 and rods 360. Without these bumps, inserting rods into metal layer 340 would involve an increased risk of cracking substrate 305. Antennas plates 370 may then be formed using conventional photolithographic techniques and protected by a passivation layer 375, which also provides impedance matching to the outside environment. It will be appreciated that other types of antennas such as the T-shaped dipoles described previously may also be formed using the technique discussed with respect to FIG. 3. Moreover, contacts 310 may be formed from the back side 330 of the substrate such that the active circuitry could cover overlay the heavily-doped contact areas. In such an embodiment, the contact areas need not extend all the way through the substrate but just reach to the level where the active circuitry is formed. Regardless of how the contact areas are formed, it will be appreciated that electrical isolation between the active circuitry and the antenna elements is enhanced by such a design. In addition, the ease of coupling to the active circuitry using, for example, intra-chip metal lines 380 and inter-chip metal lines 385 is greatly enhanced. Moreover, such a design allows the application of thermally conductive material 325 on the same side of the substrate where the active circuitry is formed. Should the active circuitry be formed on the same side of the substrate in common with the antenna elements as seen in FIGS. 1 and 2, a thermally conductive material would have to be placed on the opposite side of the substrate, thereby reducing its effectiveness.

Figure 4:
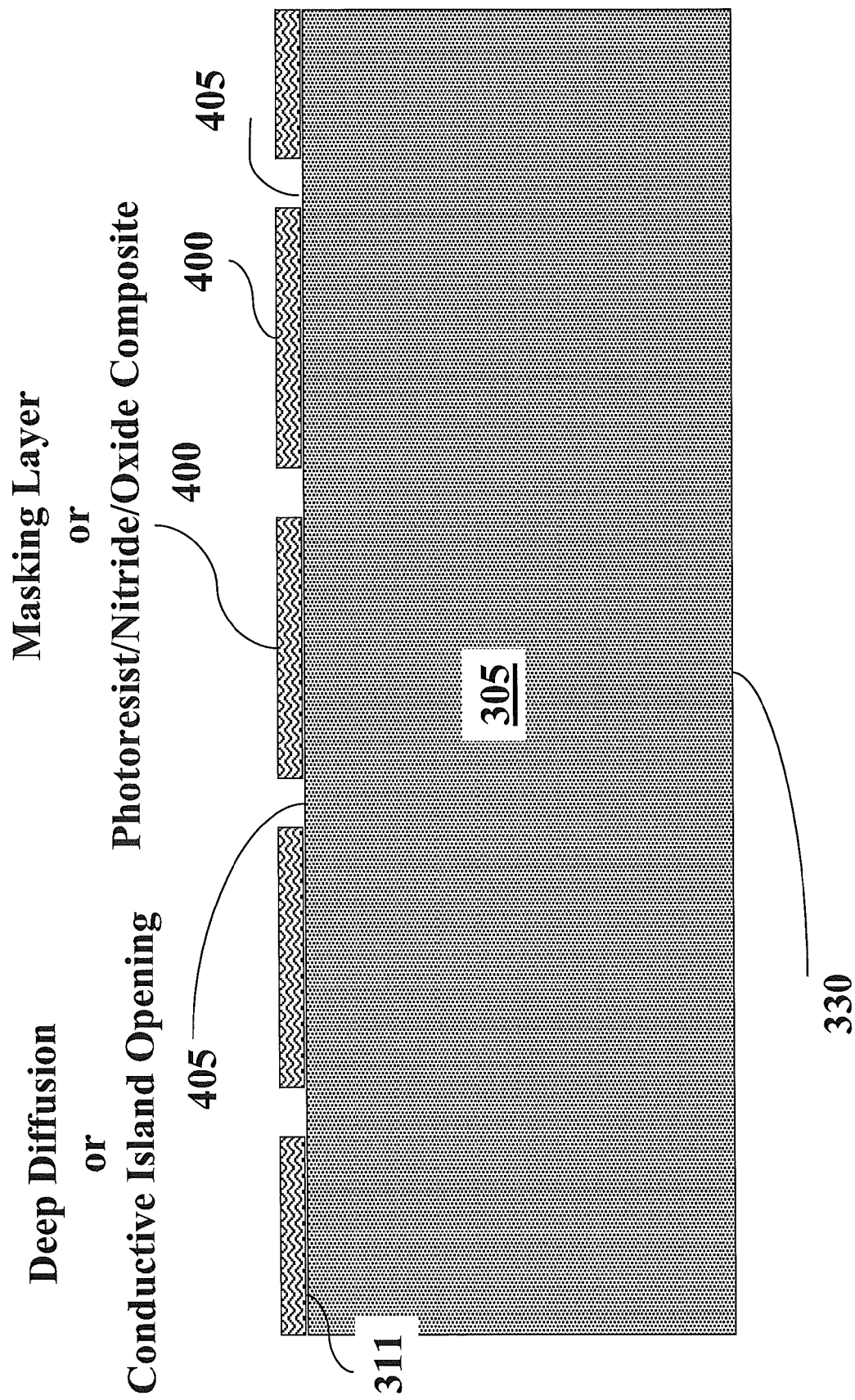
FIG. 4 is a cross-sectional view of a substrate masked with photoresist during the manufacture of a wafer-scale beam forming antenna module in accordance with an embodiment of the invention.

The manufacture of a backside wafer-scale antenna module will now be discussed in greater detail. Turning now to FIG. 4, back surface 311 of substrate 305 is masked using, e.g., a photoresist layer 400. A plurality of windows 405 in the photoresist layer correspond to the locations of future heavily doped contact areas 310 of FIG. 3. Should contact areas 310 be formed using a deep diffusion process, the masked substrate would be subjected to the appropriate diffusion at this time.

Figure 5:
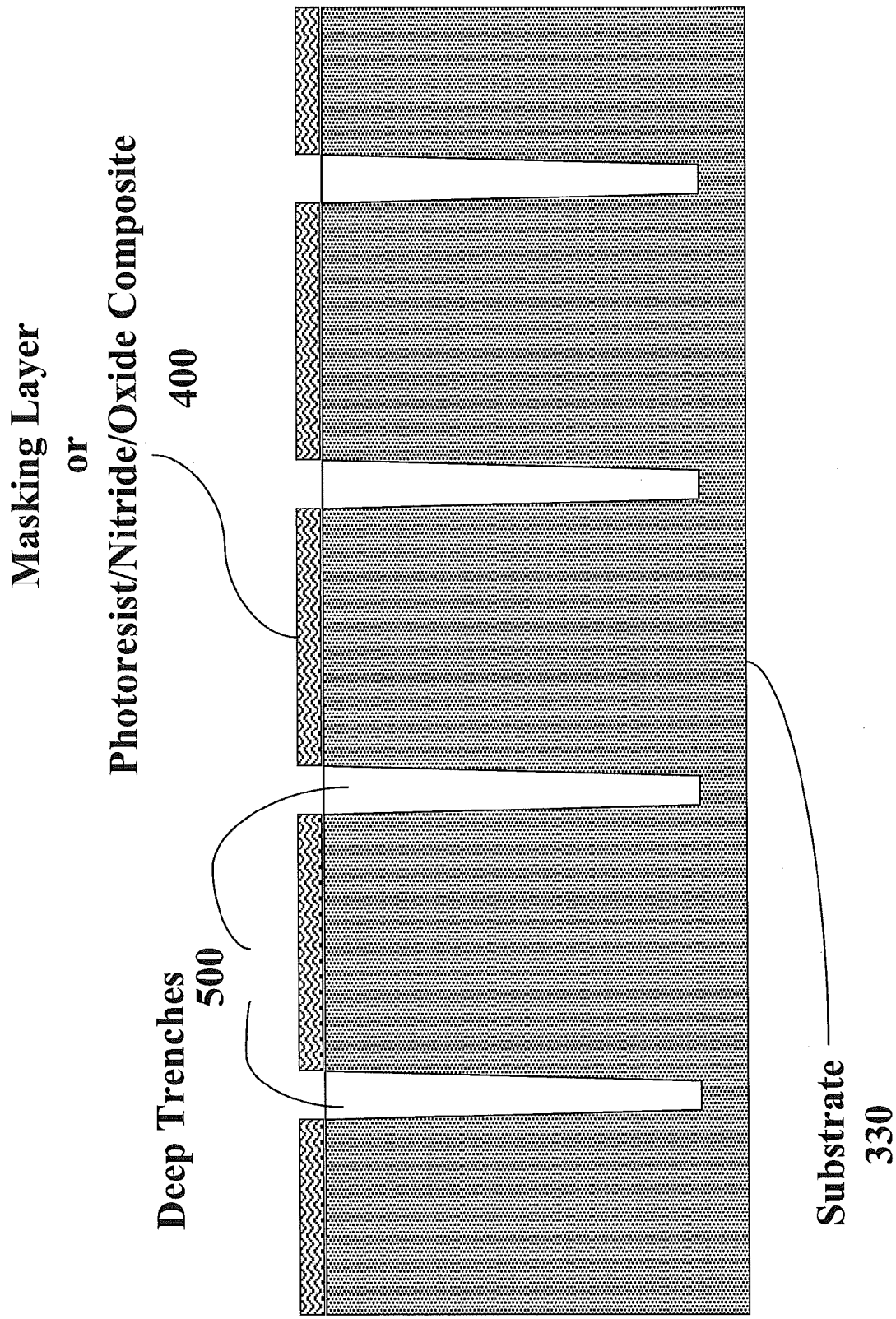
FIG. 5 is a cross-sectional view of the substrate of FIG. 4 with the trenches through windows in the photoresist layer.

Alternatively, the contact areas may be formed using an etching process as seen in FIG. 5. For example, a reactive ion etch may be used to begin the etching within each window in the photoresist layer, followed by an isotropic chemical etching process. In this fashion, trenches 500 are formed that taper towards surface 330 of the substrate. Advantageously, this taper increases the spacing between ends 505 of the trenches. In this fashion, increased area is provided for the formation of active circuitry on surface 330.

Figure 6:
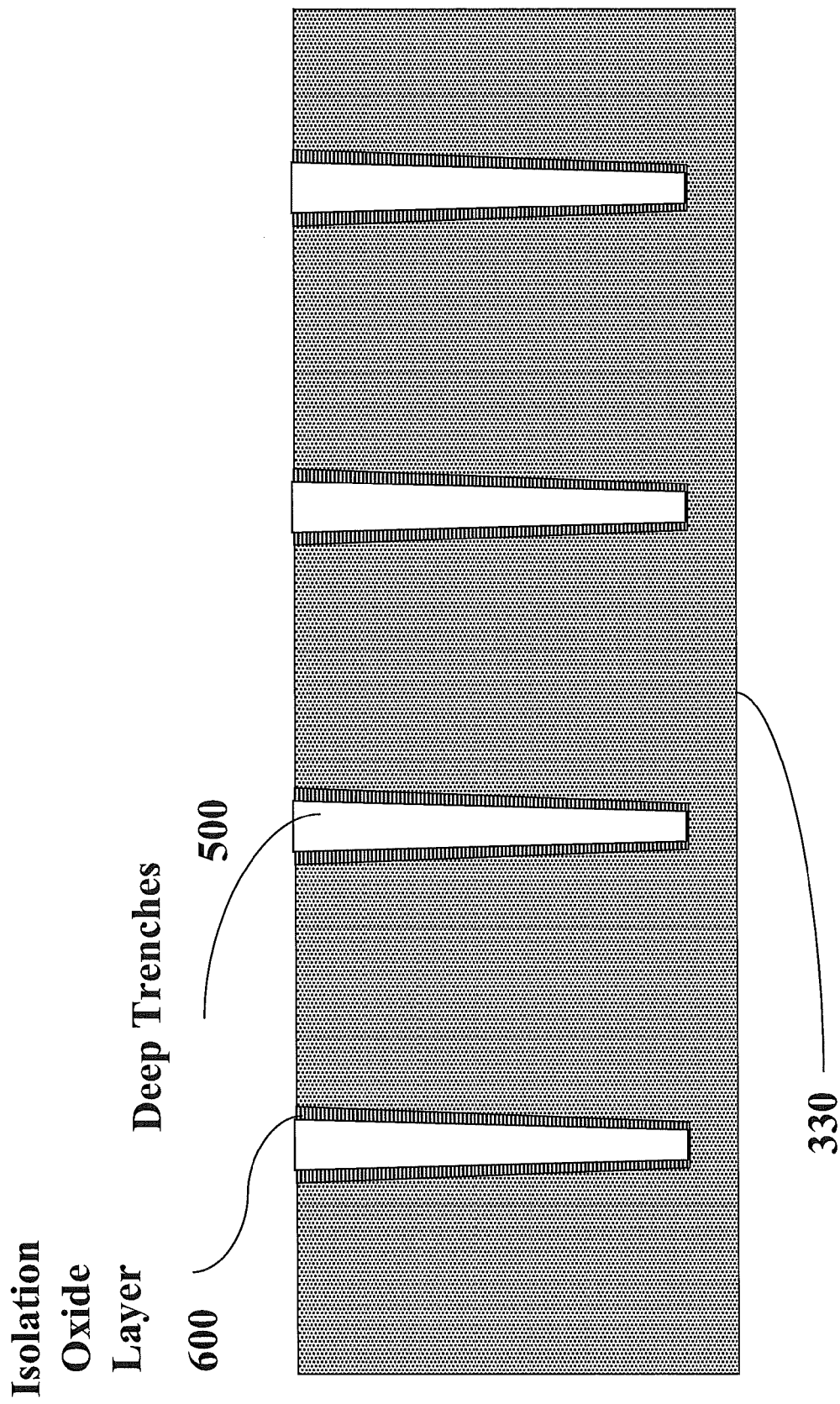
FIG. 6 is a cross-sectional view of the substrate of FIG. 5 with the trenches lined with an oxide layer.
Figure 7:
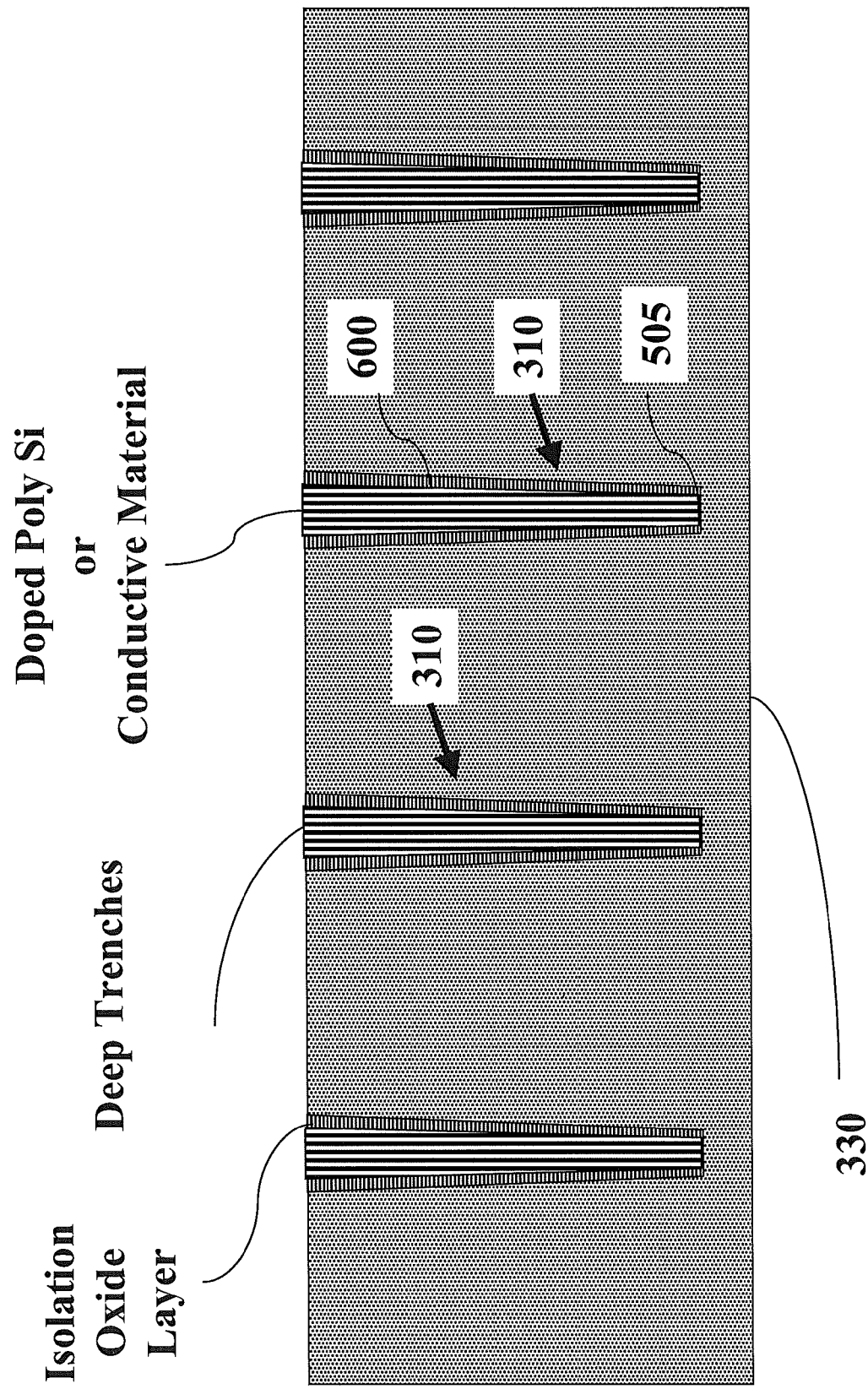
FIG. 7 is a cross-sectional view of the substrate of FIG. 6 with the lined trenches filled with conductive material.
Figure 8:
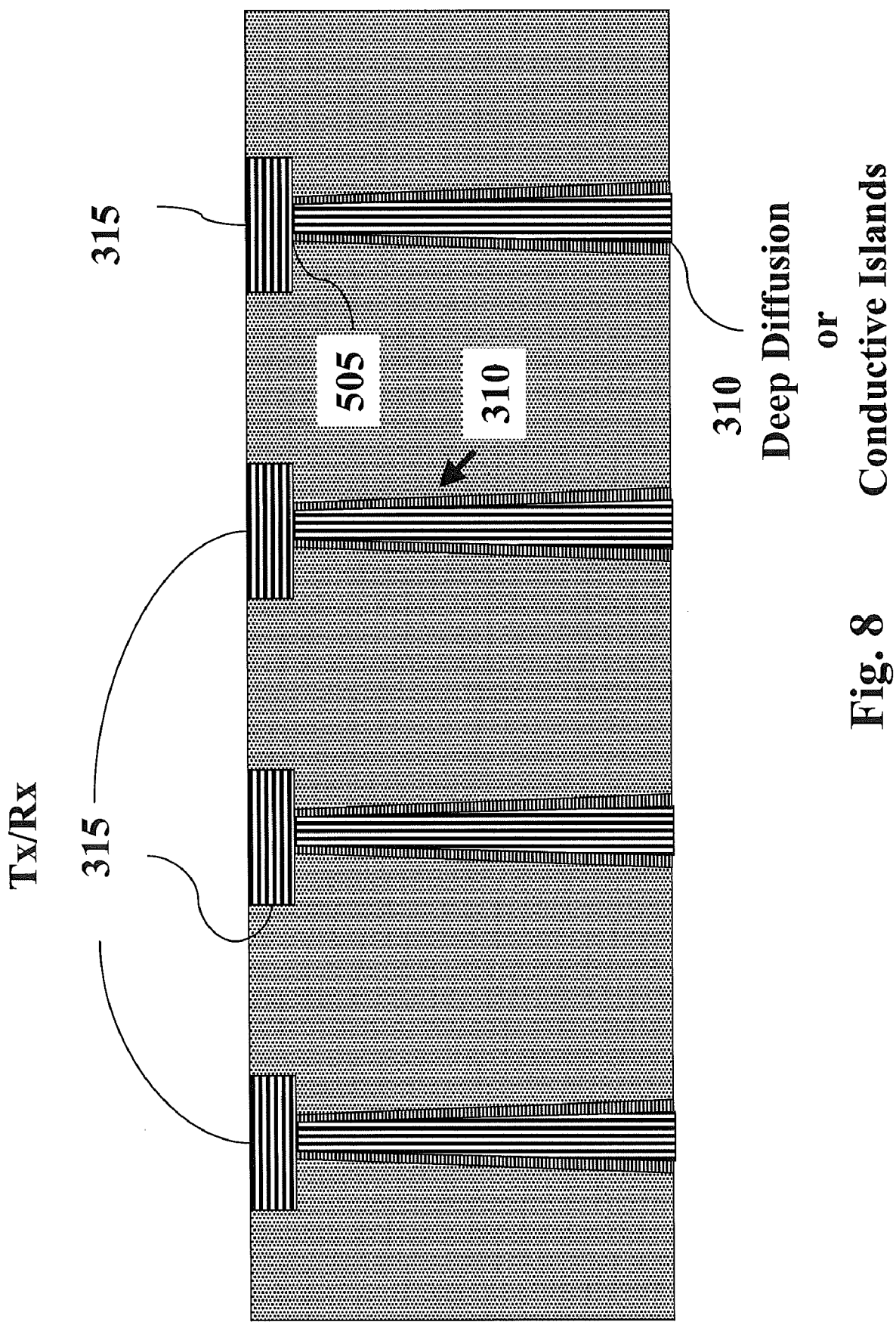
FIG. 8 is a cross-sectional view of the substrate of FIG. 7 with active circuitry formed on the backside.
Figure 9:
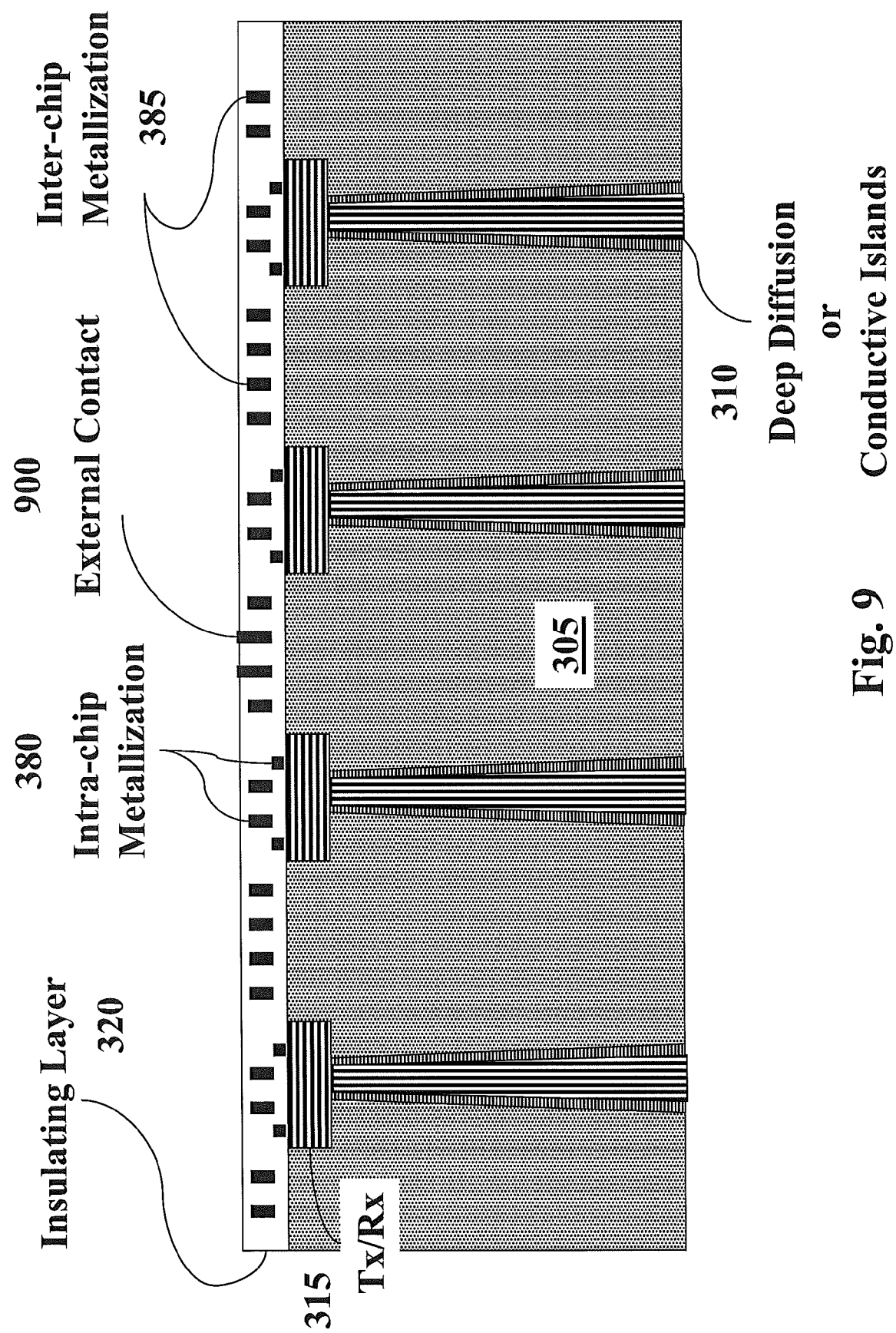
FIG. 9 is a cross-sectional view of the substrate of FIG. 8 with the active circuitry passivated.
Figure 10:
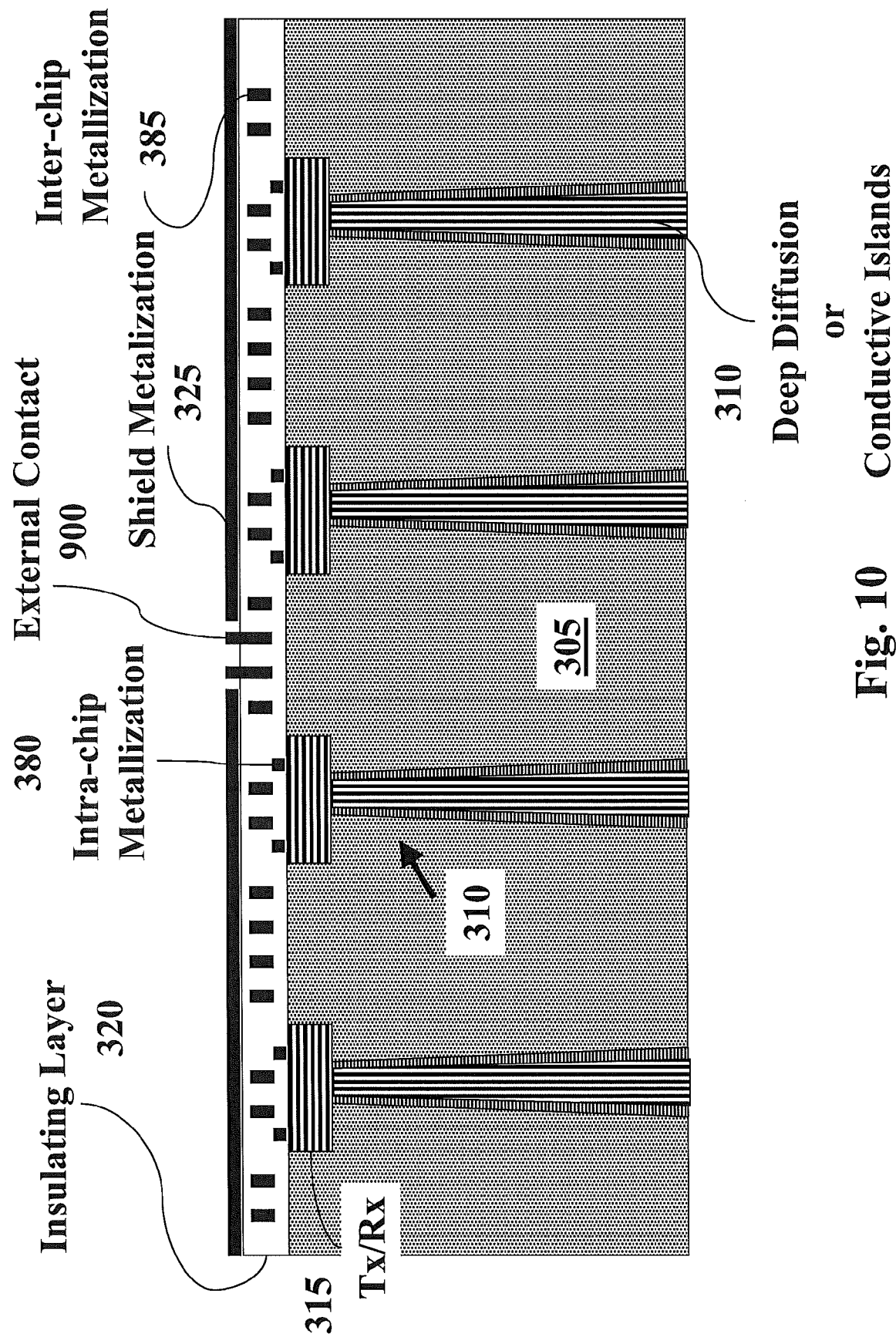
FIG. 10 is a cross-sectional view of the substrate of FIG. 9 with the passivation layer covered with a shield layer.
Figure 11:
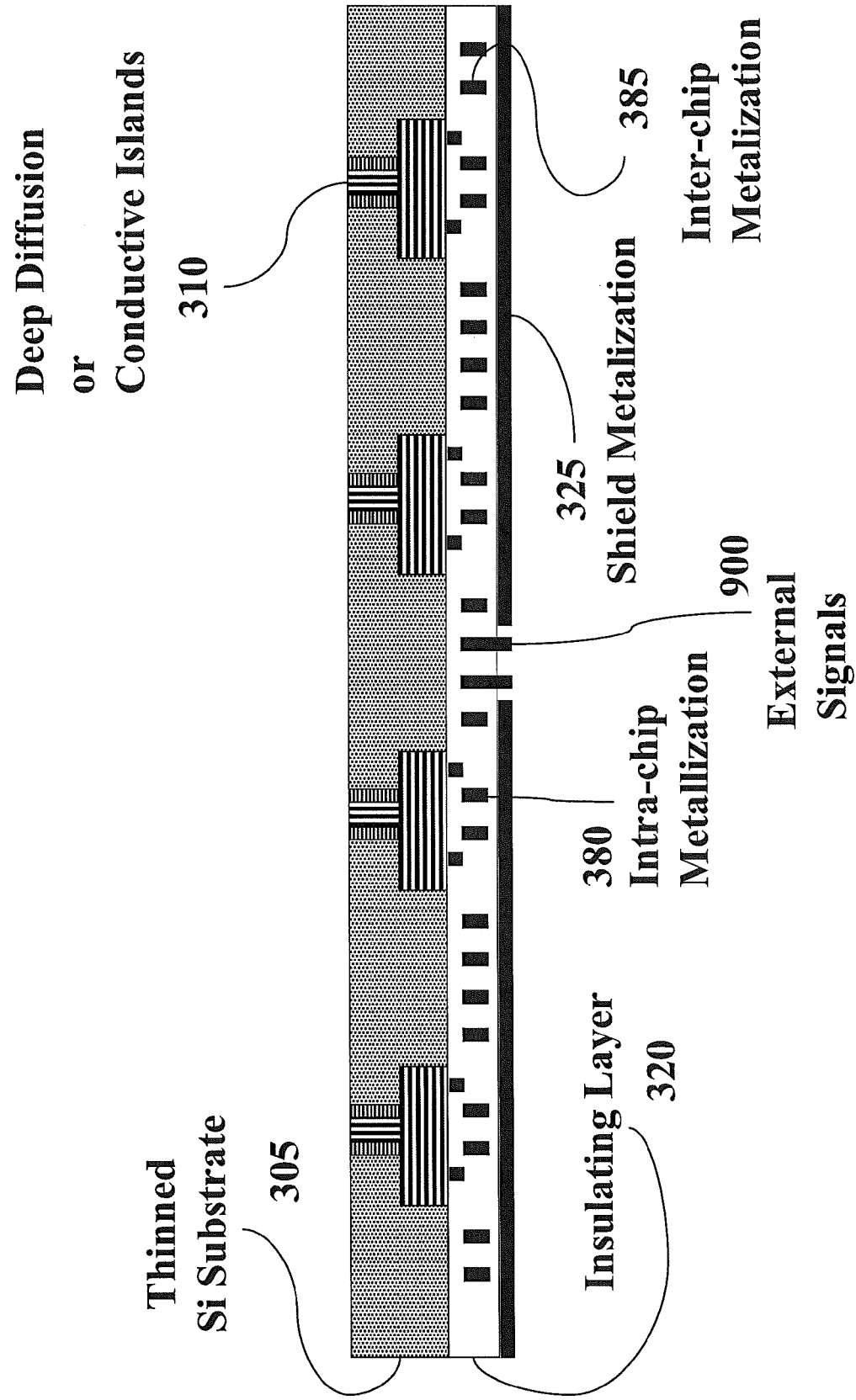
FIG. 11 is a cross-sectional view of the substrate of FIG. 10 after being flipped and thinned.

To complete the contact areas, the photoresist layer may be removed and the trenches lined with an oxide layer 600 as seen in FIG. 6. A conductive material such as doped polysilicon may fill the trenches to complete contact areas 310 as seen in FIG. 7. To prevent electrical isolation between the doped polysilicon and the trench ends 505, the trenches may be subjected to an appropriate etching such as a reactive ion etch after deposition or growth of oxide layer 600 to remove any oxide from ends 505. Turning now to FIG. 8, active circuitry 315 for beam forming transmission and reception (Tx/Rx) may then be formed on back surface 330 of the substrate. The active circuitry would couple to a diffusion region (not illustrated) that would be located adjacent ends 505 of the contact areas 310 to electrically couple the structures. To complete the backside structure, the active circuitry may be passivated with an insulating layer 320 such as a low-temperature-deposited porous silicon oxide having a final thin layer of nitridized oxide ($Si_xO_yN_z$). The insulating layer may include intra-chip metal lines 380 and inter-chip metal lines 385 as shown in FIG. 9. A set of external contacts 900 may then be patterned. An electrically-conductive and also thermally-conductive layer 325 completes the backside of the wafer as seen in FIG. 10. The wafer backside may then be taped to an adhesive holder and flipped to expose an unprocessed surface 311 of the substrate. The wafer may then be chemically ground or polished to reduce the substrate thickness to range between a few and tens of microns as seen in FIG. 11.

Figure 12:
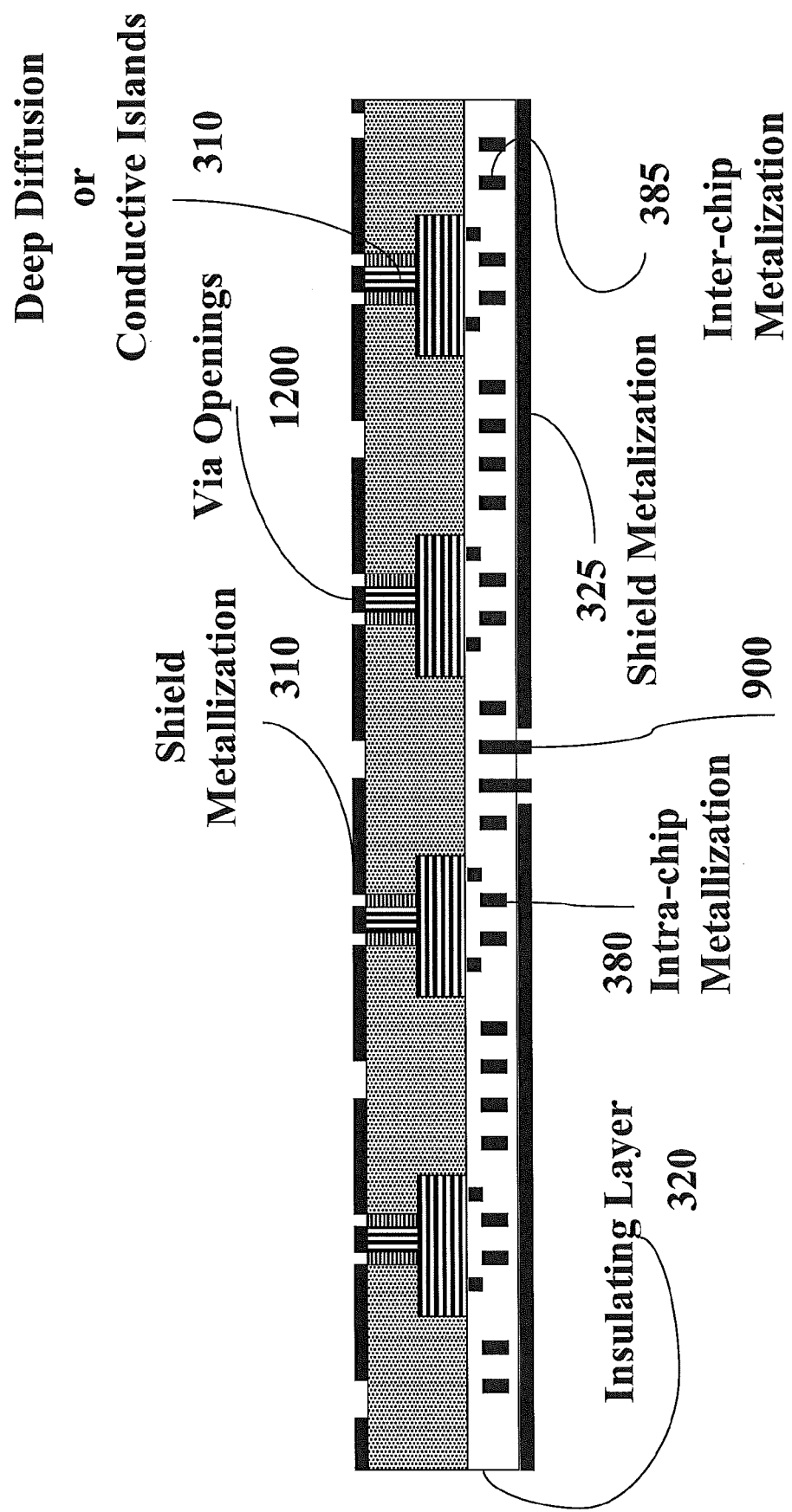
FIG. 12 is a cross-sectional view of the substrate of FIG. 11 with the front surface of the substrate covered with a patterned shielding layer.
Figure 13:
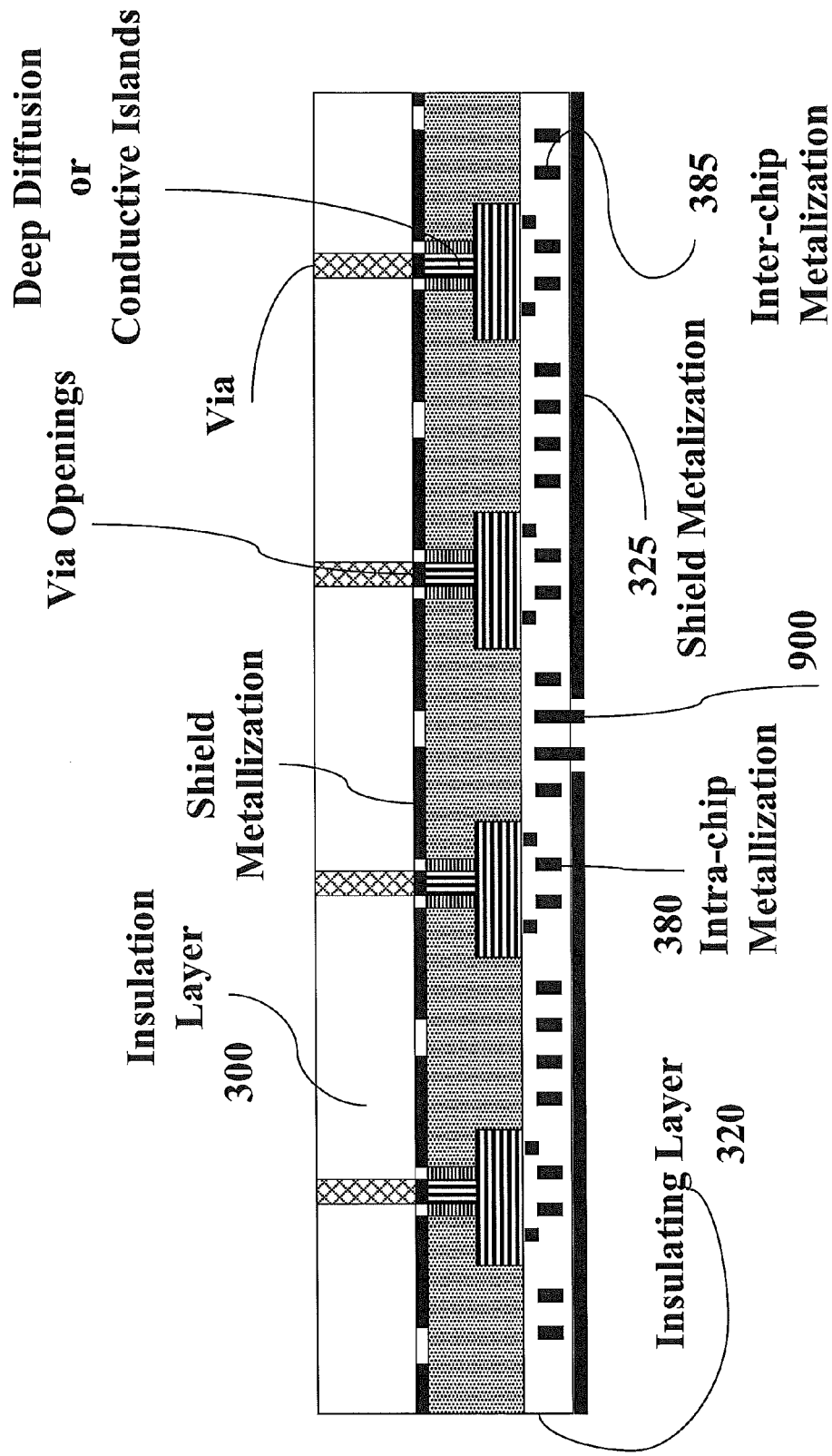
FIG. 13 is a cross-sectional view of the substrate of FIG. 12 with a via-containing insulating layer on the front surface.
Figure 14:
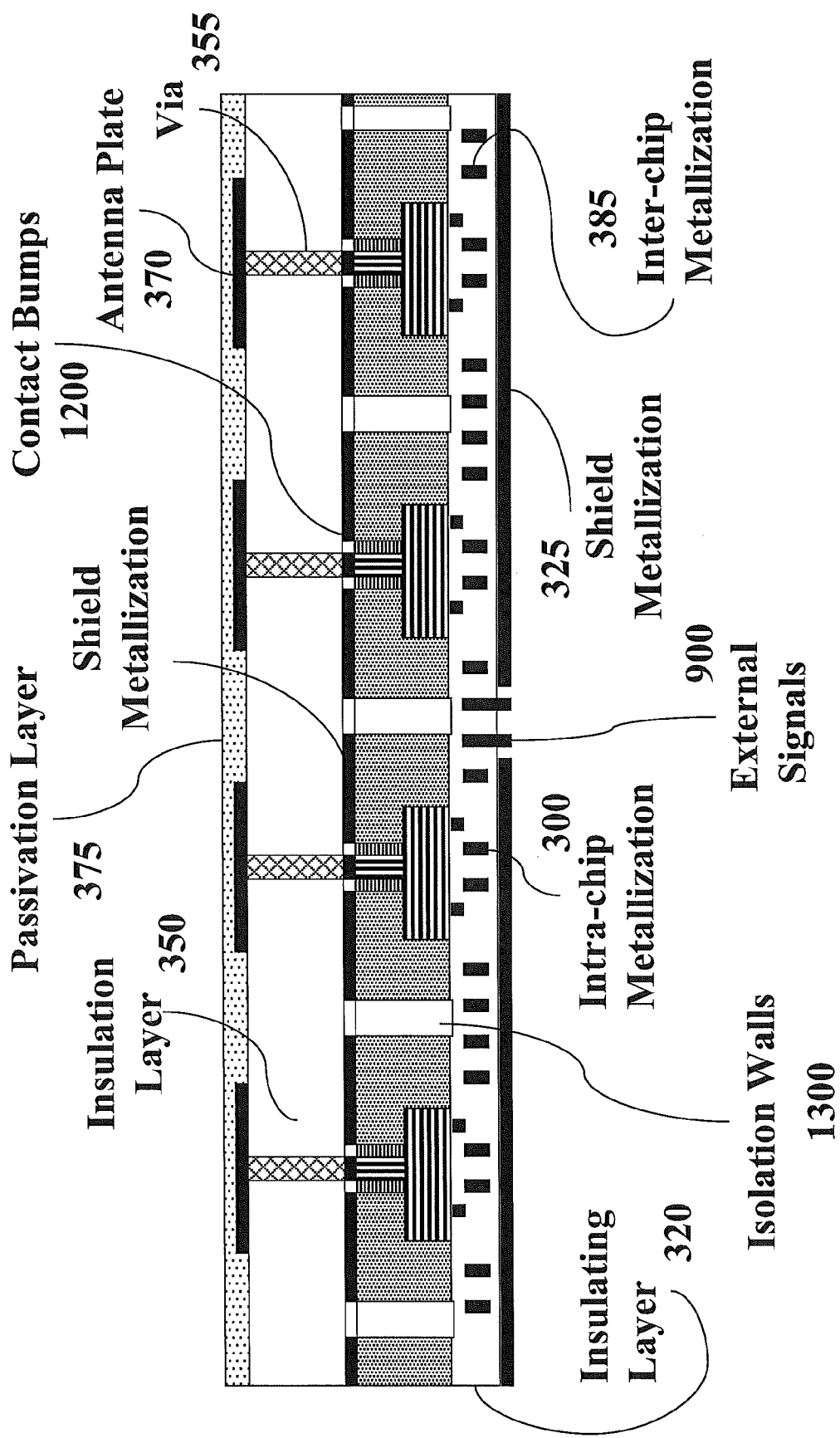
FIG. 14 is a cross-sectional view of the completed wafer-scale antenna module in accordance with an embodiment of the invention.

Surface 330 may then be coated with an electric shield 340 using as seen in FIG. 12. Shield 340 may be evaporated onto the surface, sputtered, or formed using conductive paints. Regardless of how shield 340 is formed, it functions to form a reflective plane for the antennas and shields the antennas from the active circuitry. In addition, shield 340 may function to form ohmic contacts as will be described later. Thus, shield 340 may be patterned to form bumps 1200 at surface of contacts 310. Turning now to FIG. 13, a porous low dielectric material of Teflon or other suitable material is deposited as an insulating layer 350 on shield 340. Alternatively, a honeycomb material may be deposited to form insulating layer 350. To assist in the formation of vias 355 in insulating layer 350, a target alignment pattern (not illustrated) used during conventional manufacture of the wafer may be used. Alternatively, an infrared alignment scheme may be used for positioning of the vias. The vias may be then be opened in insulating layer 350 using a variety of methods such as milling, mechanical drilling, ion drilling, or chemical etching. As seen in FIG. 14, precision metallic rods (not illustrated) may then be inserted into the vias to provide an electrical contacts to patch antennas 370. To suppress surface waves, antennas 370 may be separated from insulation layer 350 by thin plates (not illustrated) of a high dielectric material such as $Ta_2O_5$. A final passivation layer 375 protects the antennas and also matches their impedance to free space. To provide electrical isolation, the substrate may be laser scribed to form isolation walls 1400. In an alternative embodiment (not illustrated), the walls may extend through isolation layer 350. In yet another alternative, the walls may be filled with a low-dielectric material that adds mechanical strength and rigidity.

In an alternative embodiment, the antenna layer consisting of insulating layer 350 and its associated structures may be formed separated from the substrate and then attached to the substrate using an adhesive or glass fusion process. It will thus be obvious to those skilled in the art that various changes and modifications may be made without departing from this invention in its broader aspects. The appended claims encompass all such changes and modifications as fall within the true spirit and scope of this invention.

I claim:

1. A wafer-scale antenna module, comprising:
   a substrate having a first surface and an opposing second surface;
   a plurality of conductive contact regions extending from the first surface into the substrate towards the second surface;
   active circuitry formed in the substrate adjacent the second surface, the active circuitry electrically coupled to the conductive contact regions;
   an insulating layer adjacent the first surface, the insulating layer forming a plurality of vias arranged corresponding to the plurality of conductive contact regions, each via forming an opening at the corresponding conductive contact region; and a plurality of antennas formed on the insulating layer corresponding to the plurality of vias; wherein each via contains an electrical conductor to electrically couple the corresponding contact region to the antenna corresponding to the via, whereby a resulting separation between the active circuitry and the antennas aids an electrical isolation of the active circuitry from the antennas.

2. The wafer-scale antenna module of claim 1, wherein the substrate comprises silicon.

3. The integrated antenna of claim 1, wherein the plurality of antennas comprise patch antennas.

4. The wafer-scale antenna module of claim 1, wherein the plurality of antennas comprise dipole antennas.

5. The wafer-scale antenna module of claim 4, wherein the plurality of dipole antennas comprise T-shaped dipole antennas.

6. The wafer-scale antenna module of claim 1, further comprising:
a heat conducting layer formed adjacent the active circuitry.

7. The wafer-scale antenna module of claim 6, wherein the heat-conducting layer is separated from the active circuitry by a first passivation layer.

8. The wafer-scale antenna module of claim 7, wherein the plurality of antennas are covered by a second passivation layer.

9. The wafer-scale antenna module of claim 1, wherein the conductive contact regions comprise diffusion-doped regions.

10. The wafer-scale antenna module of claim 1, wherein the conductive contact regions comprise trenches filled with conductive material.

11. The wafer-scale antenna module of claim 10, wherein the conductive material is doped polysilicon.

12. The wafer-scale antenna module of claim 1, wherein the insulating layer is separated from the first surface by a conducting shield layer.

13. The wafer-scale antenna module of claim 1, wherein the conductive contact regions extend between the first and second surfaces.

14. The wafer-scale antenna module of claim 1, wherein the active circuitry forms groups of active devices, the wafer-scale antenna module further comprising laser-scribed isolation walls between the groups of active devices.

* * * * *